United States Patent [19]

Hosoya et al.

[11] Patent Number: 5,522,469
[45] Date of Patent: Jun. 4, 1996

[54] VEHICLE TRACTION ENHANCEMENT DEVICE

[75] Inventors: Haruyuki Hosoya; Minori Higuchi, both of Kawasaki, Japan

[73] Assignee: Isuzu Motors Limited, Tokyo, Japan

[21] Appl. No.: 413,988

[22] Filed: Mar. 30, 1995

[51] Int. Cl.$^6$ ................................................ B62D 61/12
[52] U.S. Cl. ...................... 180/24.02; 280/680; 280/686
[58] Field of Search ................... 180/24.02; 280/6.11, 280/704, 767, 676, 680, 686

[56] References Cited

U.S. PATENT DOCUMENTS

| | | | |
|---|---|---|---|
| 3,877,718 | 4/1975 | Scanlon et al. | 280/704 |
| 4,222,578 | 9/1980 | Meisel et al. | 280/6.11 |
| 4,223,912 | 9/1980 | Reyes | 280/767 |
| 4,462,477 | 7/1984 | Mastro | 180/24.02 |
| 4,614,247 | 9/1986 | Sullivan | 180/24.02 |
| 5,025,877 | 6/1991 | Assh | 180/24.02 |

Primary Examiner—Kenneth R. Rice
Attorney, Agent, or Firm—Kanesaka & Takeuchi

[57] ABSTRACT

A vehicle traction enhancement device is formed of a suspension attached to a frame of a vehicle, a drive axle mounted on the frame through the suspension, a driven axle mounted on frame, a bracket mounted on the drive axle substantially parallel to the frame, and an air spring mounted between the bracket and the frame. The air spring receives compressed air therein for expansion thereof when the vehicle starts to move to thereby increase pressure of drive axle tires attached to the drive axle relative to a ground.

12 Claims, 7 Drawing Sheets

VEHICLE TRACTION ENHANCEMENT DEVICE

BACKGROUND OF THE INVENTION AND RELATED ART STATEMENT

The invention relates to a rear axle suspension for large vehicles, and it especially relates to a device designed to increase traction of vehicles with two rear axles when they begin moving.

FIG. 15 is a diagram of a vehicle with two rear axles. A large vehicle (1) has a front axle (21) at a front of a frame (10), which supports front tires (21a), and two axles (31, 32) at a rear, which support rear tires (31a, 32a), respectively.

The rear axles (31, 32) are supported by the frame (10) via a suspension (40), and the cargo (50) is loaded on the frame (10).

The overall weight (WG) of the vehicle (1), including the cargo (50), is distributed to load (WF) applied to the front tires (21a) and load (WG) applied to the rear tires (31a, 32a), which are supported by the road surface (G).

By providing the two rear axles (31, 32), the weight (WR) supported at the rear is divided into weight (WRF) supported by the front rear axle (31) and weight (WRR) supported by the rear rear axle (32). Therefore, the structure of the vehicle allows larger cargo load while reducing the weight per axle.

It is common to structure this type of a two-rear axle vehicle with a drive supplied to two tires of the total six, so called 6×2 vehicle, by simplifying the power transmission system such that the front rear axle (31) is a drive axle that conveys driving force from the engine and the rear rear axle (32) is non-powered, free-rolling driven axle.

Drive axle tires (31a) on the 6×2 vehicle are required to generate sufficient driving force. Thus, the weight (WRF) on the tires (31a) must receive a sufficient load for the tires to generate a driving force against the road surface.

When the cargo is full, weight (WRF) on the drive axle (31) is sufficiently large to enable the tires (31a) to generate the necessary driving force. If the cargo is empty, however, the tires (31a) may not be able to produce sufficient driving force against the road surface (G) because the weight (WRF) on the drive axle (31) is insufficient. That is especially true when the vehicle begins to move or travel on the road surface with a small coefficient of friction, by which the tires (31a) may slip and thus cannot drive.

Japanese Utility Model Laid-Open No. 57-96081 (1982) proposes a device for vehicles that support two rear axles with a walking beam suspension, which lifts the driven tires by a hydraulic cylinder when the cargo is empty.

Air springs may be used instead of plate springs for the suspension of this type of large vehicle, and Japanese Utility Model Laid-Open No. 5-32013 (1993) discloses a suspension using air springs.

As indicated in the above mentioned Japanese Utility Model Laid-Open No. 57-96081, the 6×2 vehicle is driven as a 4×2 vehicle by lifting the rear driven tires when the cargo is empty, so that the vehicle generates sufficient driving force and has a desirable effect on fuel consumption, as well.

However, such a device as described above lifts the driven tires by means of a hydraulic cylinder. The lifted tires are stationary and supported at a certain ground clearance. When the vehicle is driven under these conditions, the driven tires may come in contact with the road surface on bumpy roads. Since the driven tires are stationary, they receive a large shock at the moment of contact with the road surface and the tires are damaged.

When a walking beam suspension is used, if the driven axle is lifted, the plate spring flexes towards the frame, which, in turn, reduces suspension performance.

The object of the invention is to provide a device that helps a vehicle to start moving by increasing the ground pressure through use of a trunnion suspension formed of plate spring and torque rods, and an air spring, and it also provides a structure for a reasonable air spring mounting.

SUMMARY OF THE INVENTION

The invention supports two rear axles with a trunnion suspension comprises: a trunnion bracket secured against a frame located on both sides of the vehicle; a plate spring supported at the center against the trunnion shaft in such a way that it freely rotates; drive and driven axles contacting both ends of the plate spring; a first torque rod connecting the bottom portion of the drive axle to the trunnion bracket; a second torque rod connecting the bottom portion of the driven axle to the trunnion bracket; a third torque rod connecting the top portion of the drive axle to the frame; and a fourth torque rod connecting the top portion of the driven axle to the frame. The suspension is equipped with a vehicular traction enhancement device located between the top end of the driven axle and the frame.

The vehicular traction enhancement device is equipped with an air spring, a bracket secured on the drive axle to support the air spring piston, and a frame side bracket secured on the frame to support the air spring diaphragm.

When the vehicle starts to move, compressed air is supplied to the air spring and the drive axle is forced away from the frame. This increases the ground pressure of the drive axle tires to generate the required driving force.

DETAILED DESCRIPTION OF PREFERRED EMBODIMENTS

Figure 1:
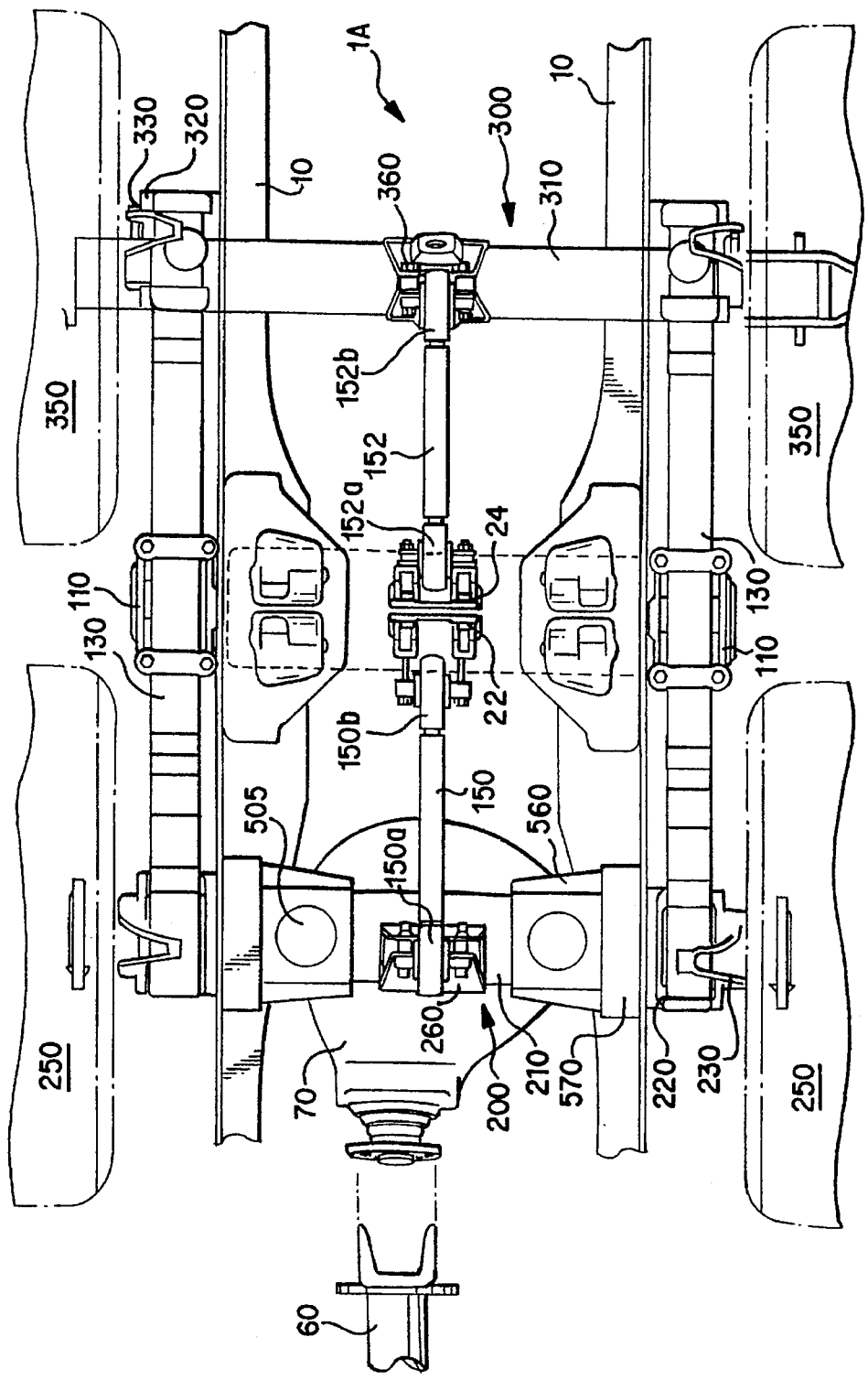
FIG. 1 is a plan view of an application example of this invention.
Figure 2:
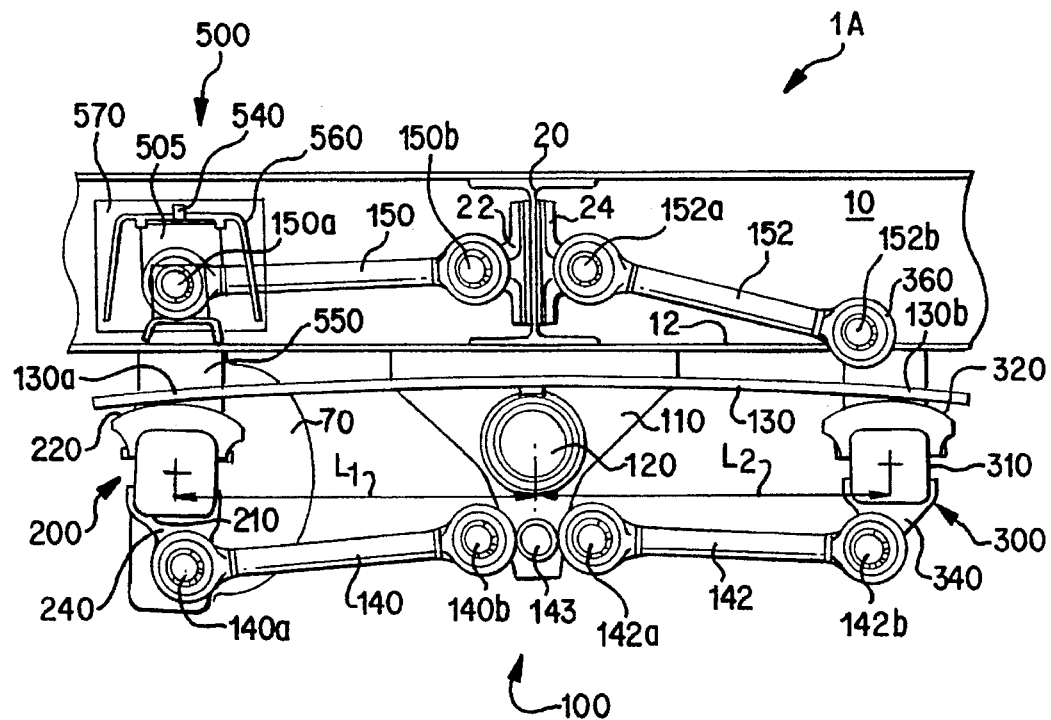
FIG. 2 is a structural drawing of the trunnion suspension with the vehicular traction enhancement device of the invention.
Figure 3:
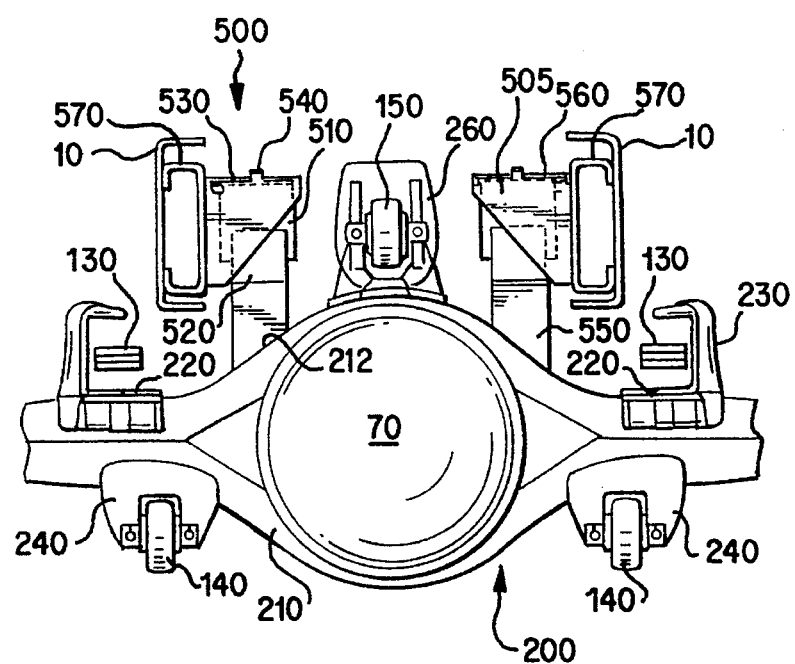
FIG. 3 is a plane view of a drive axle.
Figure 4:
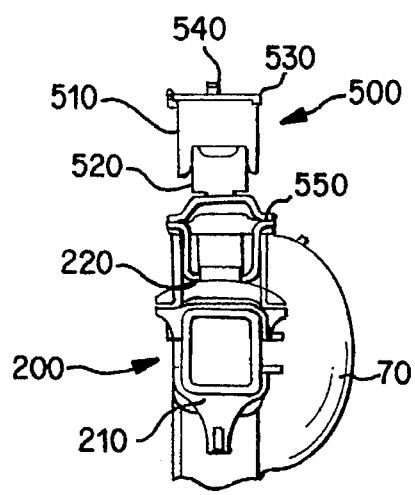
FIG. 4 is a side view of the drive axle.

FIG. 1 is a plan view of the critical part of the vehicle as an application example of this invention. FIG. 2 is a structural diagram of a trunnion suspension equipped with a vehicular traction enhancement device of the invention. FIGS. 3 and 4 are top and side views of a drive axle, respectively.

The vehicle (1A) has right and left frames (10), and the frames support the drive axle (200) and driven axle (300) with a trunnion suspension (100), which is later described.

An engine is mounted at the front of the vehicle (1A) and a propeller shaft (60) links the transmission transmit power to a differential gear mechanism mounted within a differential gear case (70), which is united with the drive axle (200). A trunnion suspension (100) has a trunnion bracket (110) secured at the bottom surface of the frame (10), and the center of a plate spring (130) is supported on a trunnion shaft (120), which is mounted on the trunnion bracket (110) in such a way that it freely rotates.

The plate spring (130) is a laminated leaf-spring, which is actually comprised of about several to ten leaves. However, a single leaf is shown in the figures in order to simplify the drawings.

The drive axle (200) is placed inside a cylindrical housing (210) in such a way that it freely rotates, and it is equipped with drive axle tires (250) at both ends. Generally, two tires (250) are mounted on one side, so that a total of four drive axle tires (250) are mounted.

A sliding seat (220) is placed on top of the housing (210) of the drive axle (200) to receive one end (130a) of the plate springs (130). The plate spring (130) generates pressure to push the drive axle (200) towards the road surface. The sliding seat (220) has spring holds (230) outside.

At the lower part of the housing (210) of the drive axle (200), one end (140a) of a first torque rod (140) is placed via a bracket (240). The other end (140b) of the first torque rod (140) is linked with one end (142a) of a second torque rod (142) via a coupling member (143).

No power is transmitted to the driven axle (300) which supports driven axle tires (350) so that they freely rotate. In general, two tires are mounted on one side, and a total of four driven axle tires (350) is mounted. It is possible, however, to mount one tire on each and to total two.

A housing (310) of the driven axle (300) has a sliding seat and the other end (142b) of the second torque rod (142) is linked, via brackets (340), with a lower part of the housing (310), which receives the other end (130b) of the plate spring (130).

A center part of the drive axle housing (210) is protruded upward and downward to contain the differential gear case (70). A bracket (260) is located at the top of the upper protruded part, to which one end (150a) of a third torque rod (150) is linked.

A cross beam (20), which is established perpendicularly to the frame (10) on the right and left sides of the body, has brackets (22, 24) on both surfaces.

The other end (150b) of the third torque rod (150) is connected to this bracket (24) and supported at the frame (10) side. The other end (152b) of the third torque rod (152) is connected to a bracket (360) established at the upper part of the driven axle housing (310).

Because the trunnion suspension (100) is structured as above, the load ratio on both axles can be selected by selecting the distance (L1) between the center of the trunnion shaft (120) and the center of the drive axle (200), and the distance (L2) between the center of the trunnion shaft (120) and the center of the driven axle (300).

The vehicular traction enhancement device of this invention is mounted at the upper part of the drive axle (200).

Figure 5:
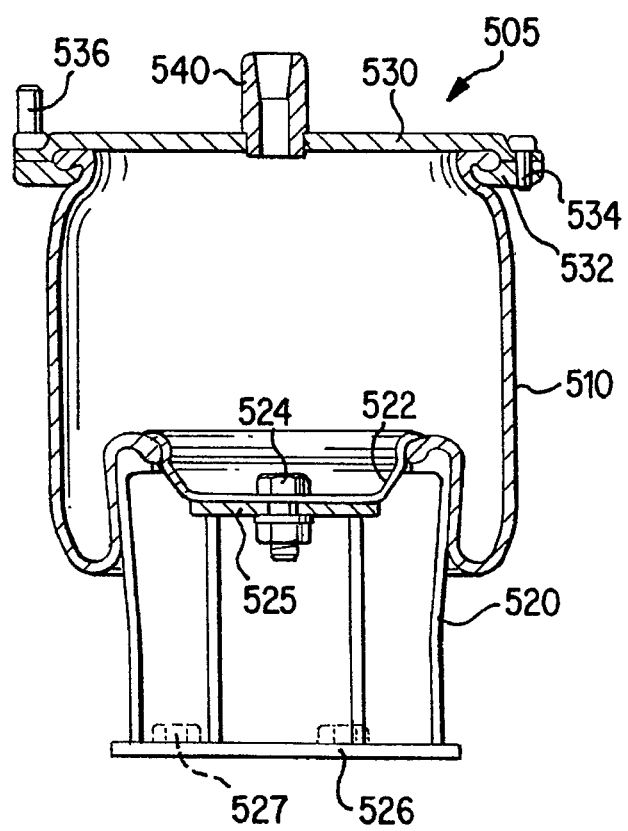
FIG. 5 is a structural drawing of an air spring.
Figure 6:
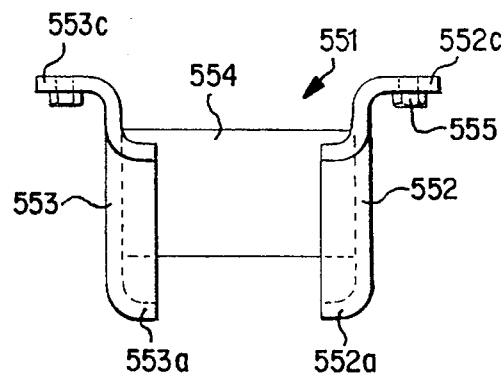
FIGS. 6A, 6B and 6C are structural drawings of the drive axle side bracket.
Figure 6:
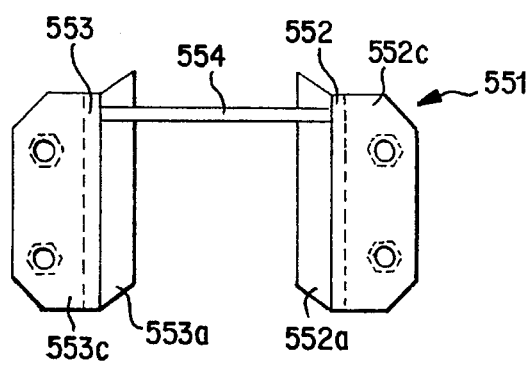
Figure 6:
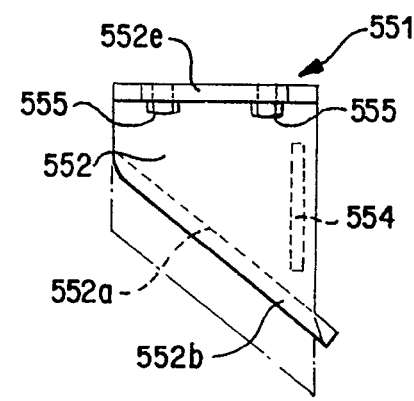
Figure 7:
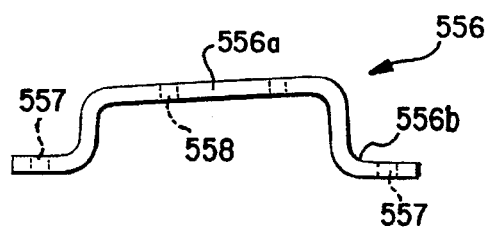
FIGS. 7A and 7B are structural drawings of the drive axle side bracket.
Figure 7:
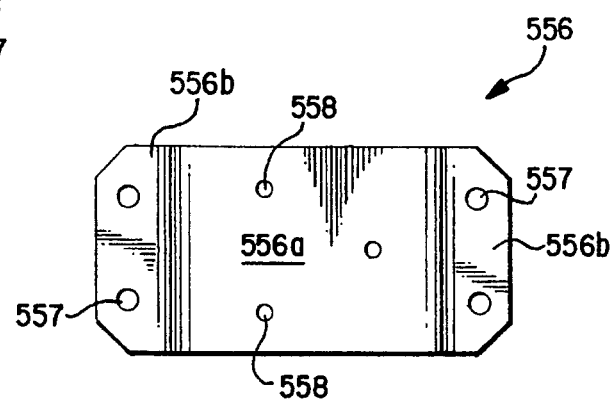

A vehicular traction enhancement device (500) is equipped with an air spring (505) and its mounting structure. FIG. 5 is a diagram of the air spring. The air spring (505) has a diaphragm (510), a piston member (520) mounted at the lower part of the diaphragm (510), and an upper plate (530) mounted above the diaphragm (510). The lower part of the diaphragm (510) is secured to an upper plate (525) of the piston member (520) with a seat member (522) and a bolt (524), and a lower plate (526) of the piston member (520) is mounted on the drive axle side bracket with nuts (527).

The upper part of the diaphragm (510) is secured to the upper plate (530) with ring members (532) and bolts (534), and a compressed air supply port (540) is located in the center of the upper plate (530). The upper plate (530) is mounted on the frame side bracket with bolts (536).

An air spring lower support bracket (550) is established at the curved part (212) of the upper part of the drive axle housing (210). The lower support bracket (550) is mounted, for instance by welding, on top of the housing (210). The piston member (520) of the air spring is secured on top of the lower support bracket (550).

A channel material with a bracket having C-shaped cross section can be used for the frame (10). A frame side bracket mounting member (570) is secured on the inner side of the frame. A bracket (560), which is open at the lower part, is united with the mounting member (570), and the upper plate (530) of the air spring (505) is contained and secured within the bracket (560). The air supply port (540) of the air spring (505) is protruded upward through the bracket (560).

The air supply port (540) is connected to the compressed air source by a pipe, which is not shown in the figures. Large vehicles are equipped with an air compressor and a high-pressure tank to support clutch and brakes. These compressed air sources can be utilized.

When compressed air is not supplied to the air spring (505), the drive axle (200) and driven axle (300) receive load in the same proportion as the regular trunnion suspension.

When compressed air is supplied to the air spring (505), the diaphragm (510) expands and urges the drive axle (200) toward the road surface. This force increases the ground pressure of the drive axle tires (520), and also increases the driving force generated between the tires and the road surface.

When a large driving force is required, a smooth movement is achieved by operating this vehicular traction enhancement device.

The air spring component of the vehicular traction enhancement device, especially the diaphragm part, is made of a highly flexible material. Thus, it is susceptible to damage. In order to protect the air spring, it is placed within the frame and is covered by brackets.

Also, the trunnion suspension housing rotates around the center line of the axle as it moves up and down. This rotation causes displacement at the upper and other support parts. The effect of this displacement can be minimized by placing the air spring above the drive axle housing.

FIGS. 6A, 6B, 6C, 7A and 7B are detailed diagrams of the bracket (550) secured above the housing (220) of the drive axle (200).

This bracket (550) is comprised of a first bracket member (551) and a second bracket member (556). The first bracket member (551) has a pair of opposing plate materials (552, 553) and a plate material (554) that connects the opposing plate materials (552, 553). The ends of these plate materials (552, 553) are bent inward to form curved parts (552a, 553a), and their curve lines (552b, 553b) cross the plane of the plate material (554) at an angle. The curve line angle of the curved parts (552a, 553a) is set such that the other end face of the plate materials (552c, 553c) forms an almost horizontal plane when the curved parts (552a, 553a) are welded to the curved upper part of the housing (212) of the drive axle (200), which encloses the differential gear case (70).

Nuts (555) are welded on the bottom surface of the plane end surfaces (552c, 553c), and the second bracket members (556) are secured with bolts.

The second bracket members (556) are produced by bending a piece of rectangular plate. Both end parts (556b) are stepped from the middle part (556a), and have bolt openings (557) that correspond to nuts (555) on the first bracket member (551).

The plane of the middle part (556a) and plane passing through both end parts (556b) cross at a certain angle. The angle is set so that the axis of the piston (520) becomes perpendicular when the middle part (556a) supports the bottom plate (526) of the piston (520).

The middle part (556a) has three bolt openings (558) to secure the piston (520) with nuts (527) established at the bottom plate (526) of the piston of the air spring (505).

Figure 8:
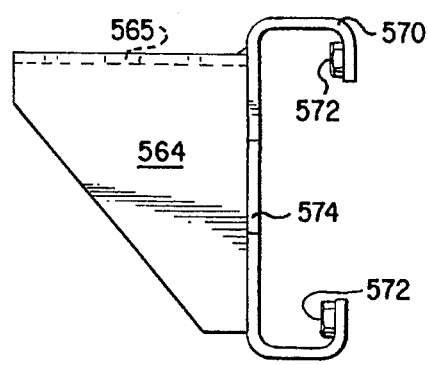
FIGS. 8A, 8B and 8C are structural drawings of the frame side bracket.
Figure 8:
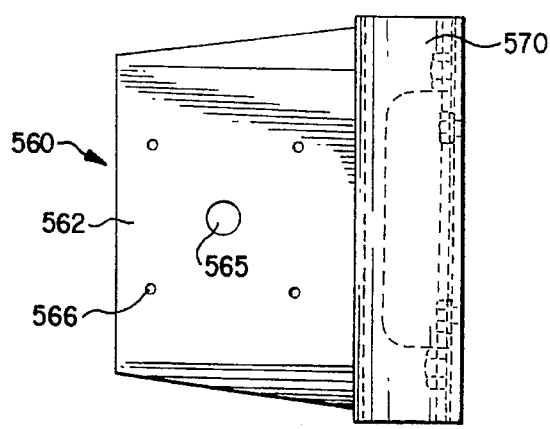
Figure 8:
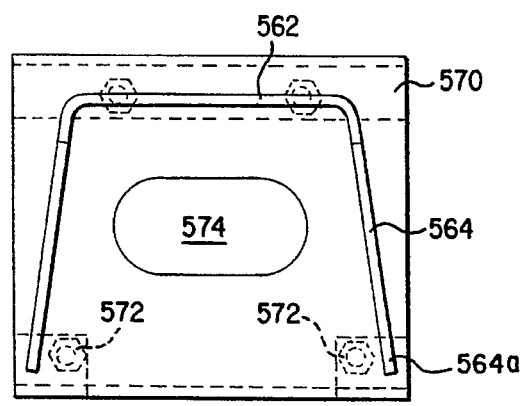

FIGS. 8A, 8B and 8C are front, plane, and side views, respectively, of the frame side bracket.

The frame side bracket has a mounting part (570) used for mounting on the frame that has an open cross section, and an air spring mounting bracket (560) welded on the mounting part (570). The mounting part (570) has four nuts (572) that are secured to the frame (10) with bolts. The mounting part (570) also has a weight reduction (lightening) hole (574).

The bracket (560) has an upper surface part (562) that is formed horizontally to mount the upper plate of the air spring. Both sides of the upper surface part are connected to the covers (564), which cover the sides of the air spring diaphragm (510). The cover (564) is tapered with the lower end part (564a) being larger.

In the center of the upper surface part (562), an opening (586) is established for the compressed air supply port (540) to pass therethrough. Around this hole (586) there are four bolt openings (566). Bolts (536) established on the upper plate (530) of the air spring (505) are inserted to the bolt openings (566) and secured with nuts.

As described above, the vehicular traction enhancement device (500) of this invention is comprised of the air spring (505), frame side brackets (560, 570) that are secured on the frame to support the air spring upper plate and to protect the air spring diaphragm, and the drive axle side brackets (550) that are secured on top of the drive axle housing to support the lower part of the air spring piston.

When compressed air is supplied to the air spring as the vehicle begins to move, the diaphragm (510) expands and the piston pushes the drive axle (200) down, resulting in increased ground pressure of the drive axle tires. Therefore, the driving force of the drive axle tires is sufficient to achieve smooth roll out of the vehicle.

Figure 9:
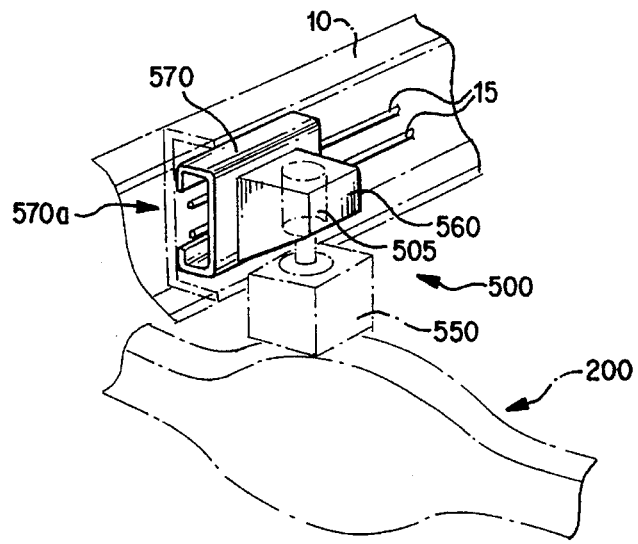
FIG. 9 is a diagram showing a mounting structure of the frame side bracket.

FIG. 9 is a detailed diagram of the mounting structure for the frame side brackets (560, 570) of the vehicular traction enhancement device (500).

The cross section of the bracket mounting part (570) is rectangular with a missing center part of one long side, and it is secured inside the vehicle frame (10), the cross section of which is a bracket with C-shape. Thus, the mounting part (570) mounted on the frame (10) has a closed cross section structure (570a) that reinforces the rigidity of the frame (10).

In addition, by containing pipes and wires within this structure (570a), the pipes and wires are protected.

A lower surface cover (620) has a circular opening (622) through which the air spring (505) passes. Therefore, the diameter of the opening (622) corresponds to the diameter of the air spring (505). The lower surface cover (620) and the front surface cover (630) can either be formed integrally or separately.

Because this invention is structured as described above, the air spring comprising the vehicular traction enhancement device can be securely mounted between the curved housing, which is located near the drive axle differential gear case and the vehicle frame.

The air spring diaphragm is also securely covered to minimize the risk of damage.

Figure 10:
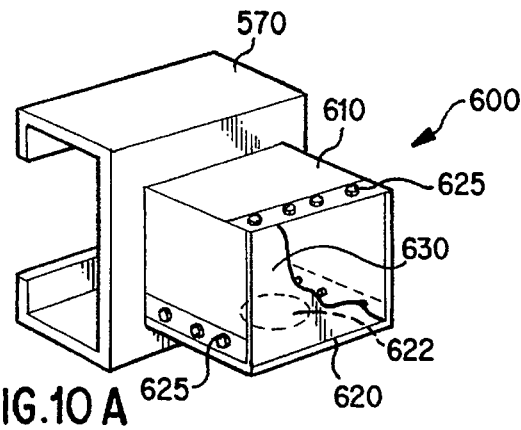
FIGS. 10A and 10B are diagrams showing another application example of the frame side bracket.
Figure 10:
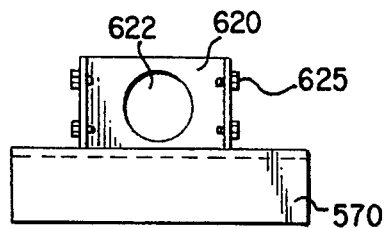

FIGS. 10A and 10B are perspective and bottom views of another application example of this invention.

This device relates to improving the brackets that are mounted on the frame. The mounting part (570) secured on the frame is the same as the one in the aforementioned application example.

This bracket (600) is in the shape of a box, and the bracket body (610), which forms the top and side surfaces, is made of metal. The member must have sufficient rigidity because it supports the top plate of the air spring.

The front and bottom surface of the bracket body are open, the front opening is covered with a front surface cover (630) made of a flexible material, and the bottom opening is covered with a bottom surface cover (620) made of flexible material. The cover material is either rubber or composite resin and is attached to the bracket body (610) with an appropriate fastener (625).

The followings are application examples for vehicles equipped with various types of suspensions that have equalizer mechanisms.

Figure 11:
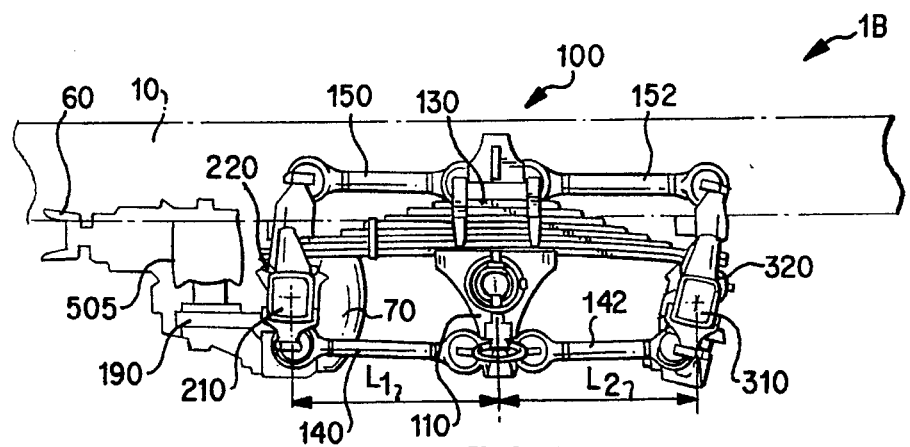
FIG. 11 shows an application example for a vehicle with a trunnion suspension.

FIG. 11 is an application example for a vehicle with a trunnion suspension.

The vehicle (1B) is equipped with a trunnion suspension (100) at the rear portion of the vehicle frame (10).

The trunnion suspension (100) has a trunnion base (110) that is mounted on the vehicle frame (10) via a trunnion shaft, and the center part of a layered plate spring (130) is secured above the trunnion base (110). Both ends of the layered plate spring (130) are placed above a drive axle (210) and a driven axle (32) via sliding seats (220, 320).

The drive axle (210) is equipped with a differential gear case (70) in the middle, to which power is transmitted from the engine via a propeller shaft (60). Ends of the torque rods (140, 150) are connected to the upper and lower parts of the drive axle (210), and the other ends of the torque rods (140, 150) are connected to the vehicle frame (10) and the trunnion base (110) integrally connected to the frame.

The driven axle (310) does not have a power transmitting mechanism, and has an axle that supports tires (not shown) in a way to alloy free rotation and a braking mechanism.

The upper and lower parts of the driven axle (310) are connected to the frame and the trunnion base via torque rods (142, 152).

Because the trunnion suspension (100) is structured as explained above, the distance (L1) between the center of the trunnion base (110) and the center of the drive axle (210), and the distance (L2) between the center of the trunnion base (110) and the center of the driven axle (310) can be set by selecting the length of the torque rods and plate spring (130). Proportion of axle load on drive axle (210) and driven axle (310) is adjusted through the ratio of the distances (L1, L2).

With a full cargo, the load is distributed to the drive axle (210) and driven axle (310), and the tires (not shown) of the drive axle (210) gain sufficient load to generate driving force against the road surface.

In the trunnion suspension in this application example, the air spring (505) is mounted between a bracket (190) established on the drive axle (210) and the frame (10). The air spring (505) is the same as described in the aforementioned application example.

Figure 12:
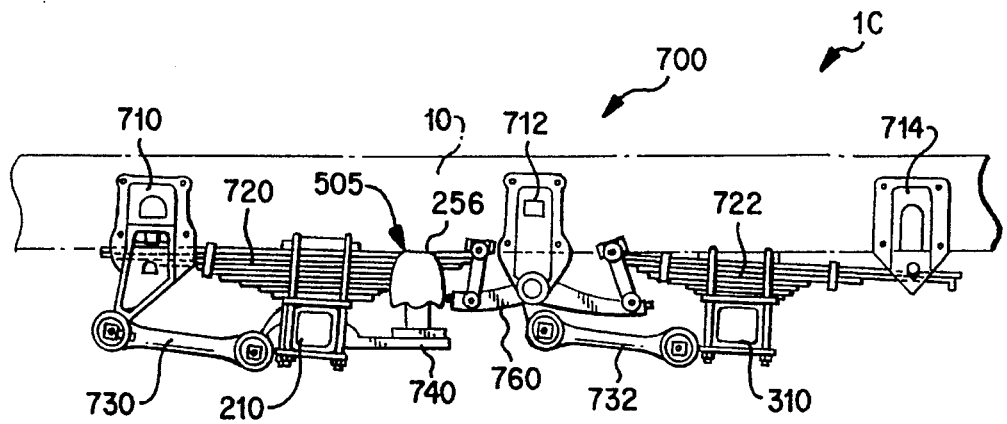
FIG. 12 shows an application example for a vehicle with an equalizer beam suspension.

FIG. 12 is an application example (1C) for a vehicle with 4-spring type suspension.

This suspension (700) has three brackets (710, 712, 714) that are secured on the vehicle frame (10). The first bracket (710) supports a front part of a first plate spring (720), and a rear part of the first plate spring (720) is supported by the front end of an equalizer beam (760) slidably supported on the second bracket (712). The bottom center of the first plate spring (720) is attached to a drive axle (210), and a torque rod (730) connects the drive axle (210) and the first bracket (710).

A rear end of the equalizer beam (760) supports a front end of a second plate spring (722), and the third bracket (714) supports a rear end of the second plate spring (722). The bottom center of the second plate spring (722) is attached to a driven axle (310). The driven axle (310) and the second bracket (712) are connected by a torque rod (732).

As described above, the suspension is equipped with two plate springs (720, 722) on one side, and adjusts the offset load using an equalizer beam (760). In this application example, a bracket (740) is secured to the drive axle (210), and an air spring (505) is mounted between the bracket (740) and the vehicle frame (10). The air spring (505) is the same as described in the aforementioned application examples.

Figure 13:
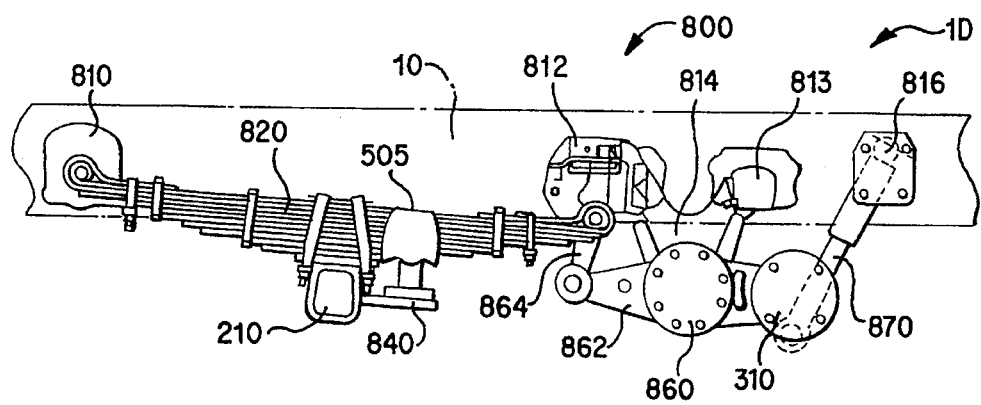
FIG. 13 shows an application example for a vehicle with a rocker arm suspension.

FIG. 13 is an application example for a vehicle (1D) with a rocker beam suspension.

This suspension (800) has a bracket (810), which is secured to a vehicle frame (10), that supports a front part of a plate spring (820).

A shaft (860), which is mounted at a rear of the vehicle frame (10) via a bracket (814) secured by mounting parts (812, 813), supports a rocker arm (862) so that it freely rotates. A front end of the rocker arm (862) supports a rear end of the plate spring (820) via a rod (864). The bottom center of the plate spring (820) is attached to a drive axle (210). A rear end of the rocker arm (862) is attached to a driven axle (310). A cylinder (870) is mounted between the driven axle (310) and a mounting part (816) at the frame side.

In this application example, a bracket (840) is attached to the drive axle (210), and an air spring (505) is mounted between the bracket (840) and the frame (10). The air spring (505) is the same as described in the aforementioned application examples.

Figure 14:
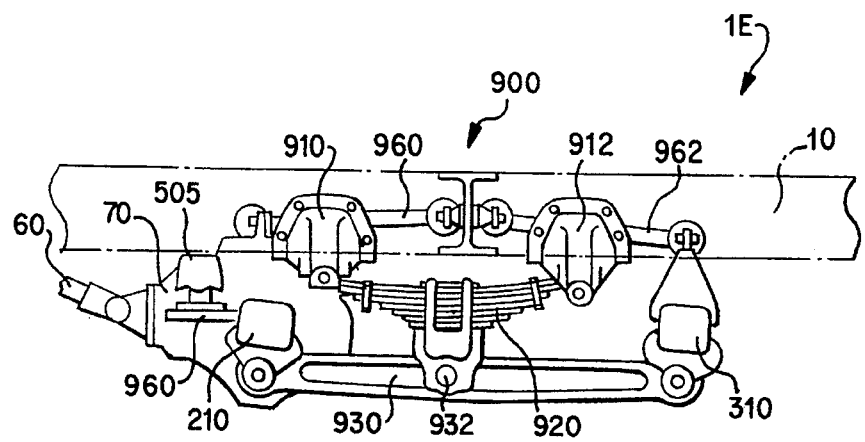
FIG. 14 shows an application example for a vehicle with a walking beam suspension.
Figure 15:
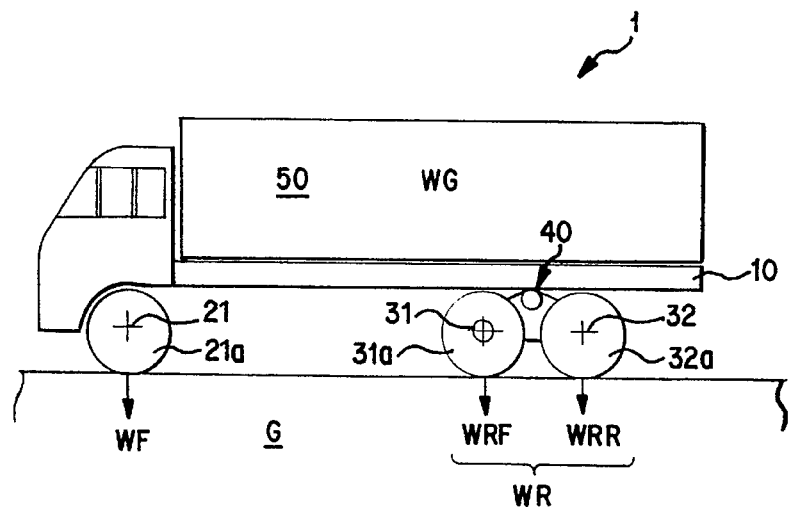
FIG. 15 shows a two-rear drive axle vehicle.

FIG. 14 is an application example of a vehicle (1E) with a walking beam suspension.

This suspension (900) has two brackets (910, 912), which are secured to a vehicle frame (10), to support the front and back of a plate spring (920). A center part of a walking beam (930) is free rotationally mounted at the bottom center of the plate spring (920) via a shaft (932).

The front and rear ends of the walking beam (930) support the drive axle (210) and driven axle (310), respectively. The drive axle (210) is connected to a differential gear case (70), to which power is transmitted from a propeller shaft (60).

A torque rod (960) connects the upper part of the differential gear case (70) to the frame (10), and a torque rod (962) connects the upper part of the driven axle (310) to the frame (10).

In this application example, a bracket (960) is established on the drive axle (210), and an air spring (505) is mounted between the bracket (960) and the frame (10).

As explained above, the invention is applied to vehicles with a trunnion suspension that supports rear axles, which will be equipped with a vehicular traction enhancement device using a air spring above the drive axle of the rear axles. By supplying compressed air to the air spring, the drive axle is pressed down against the road surface. This ground pressure on the drive axle tires is increased to generate increased driving force. Therefore, the device helps the vehicle to start moving by supplying larger driving force required for a smooth start.

The air spring has a diaphragm made of a soft material that is susceptible to damage from flying stones and the like. In this device, however, the air spring is protected by being mounted inside the vehicle frame and covered with a bracket.

In the invention, the air spring is mounted above the trunnion suspension drive axle. Since the drive axle has a differential gear case, the drive axle housing is also curved upward and downward at the center. Therefore, the drive axle side bracket, which supports the piston side of the air spring, must be secured on the top surface of the curved housing. For this reason, the drive axle side bracket is comprised of two members. The first member is welded on the curved housing. The second member is secured to the first member with bolts to provide a horizontal plane on the top surface of the second member that can securely support the air spring piston.

Durability is also secured because the frame side bracket supports the air spring diaphragm that is covered by a flexible material.

What is claimed is:

1. A vehicle traction enhancement device for a vehicle having a frame, a front axle, and first and second rear axles, said first rear axle being a drive axle and the second rear axle being a driven axle, comprising:

a trunnion suspension for supporting the two rear axles including a trunnion bracket secured to the vehicle frame; a trunnion shaft rotationally attached to the trunnion bracket; a plate spring supported at a center thereof by the trunnion shaft, said first and second rear axles being mounted on both ends of the plate spring; a first torque rod situated between a lower part of the first rear axle and the trunnion bracket; a second torque rod situated between a lower part of the second rear axle and the trunnion bracket; a third torque rod situated between an upper part of the first rear axle and the frame; and a fourth torque rod situated between an upper part of the second rear axle and the frame, an air spring mounted between an upper part of the first rear axle and the frame, and means for supplying compressed air to the air spring, said compressed air being supplied to increase pressure of drive axle tires connected to the first rear axle relative to a ground at a time of starting the vehicle.

2. A vehicle traction enhancement device according to claim 1, wherein said air spring includes a diaphragm, a piston situated below the diaphragm, an upper supporting part situated above the diaphragm, and a supply port of the compressed air; said enhancement device further including a first bracket situated above the first rear axle to secure the piston, and a second bracket secured on the frame to support the upper supporting part.

3. A vehicle traction enhancement device according to claim 2, wherein said second bracket secured to the vehicle frame includes a mounting part secured to an inner side of the frame, and an enclosure member secured to the mounting part and enclosing at least two sides and an upper part of the air spring.

4. A vehicle traction enhancement device according to claim 1, further comprising a drive axle side bracket secured on the first rear axle to support a lower part of the air spring, and a frame side bracket secured on the frame to support an upper part of the air spring diaphragm.

5. A vehicle traction enhancement device according to claim 4, wherein said drive axle side bracket is formed of a first bracket member welded at a bottom to a top surface of a curved drive axle housing, and a second bracket member secured on a top surface of the first bracket member.

6. A vehicle traction enhancement device according to claim 4, wherein said frame side bracket is formed of a mounting part secured to an inner side of the frame, and an enclosure member secured to the mounting part and enclosing at least two sides and an upper part of the air spring.

7. A vehicle traction enhancement device according to claim 6, wherein said frame side bracket further includes a covering member made of a flexible material for covering an opening of the air spring other than a through part thereof.

8. A vehicle traction enhancement device for a vehicle having a frame, comprising:

a suspension attached to the frame, a drive axle mounted on the frame through the suspension, a bracket mounted on the drive axle substantially parallel to the frame, and an air spring mounted between the bracket and the frame, said air spring receiving compressed air therein to expand when the vehicle starts to move to thereby increase pressure of drive axle tires attached to the drive axle relative to a ground.

9. A vehicle traction enhancement device according to claim 8, wherein said suspension is a trunnion suspension including a trunnion base supported by the frame, a plate spring having a center portion secured at an upper part of the trunnion base, said plate spring being supported at both ends by the drive axle and a driven axle, and torque rods situated at upper and lower parts of the drive and driven axles.

10. A vehicle traction enhancement device according to claim 8, wherein said suspension is an equalizer beam suspension including a first plate spring supporting the drive axle, a second plate spring supporting a driven axle, and an equalizer beam rotationally supported to the frame at a center thereof and supporting ends of the first and second plate springs.

11. A vehicle traction enhancement device according to claim 8, wherein said suspension is a rocker arm suspension including a rocker arm rotationally supported by the frame, and a plate spring having a front part supported by the frame and a rear part supported by a front end of the rocker arm, said drive axle being supported at a center of the plate spring and a driven axle being supported at a rear end of the rocker arm.

12. A vehicle traction enhancement device according to claim 8, wherein said suspension is a walking beam suspension including a plate spring supported by the frame, and a walking beam free rotationally supported in a middle thereof by the plate spring and having a front end attached to said drive axle and a rear end attached to a driven axle.

* * * * *